US007860856B2

(12) United States Patent  
Lewis

(10) Patent No.: US 7,860,856 B2
(45) Date of Patent: *Dec. 28, 2010

(54) COMPUTER-IMPLEMENTED METHOD AND APPARATUS FOR MATCHING PAINT

(75) Inventor: Mark D. Lewis, Fairview Park, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 377 days.

This patent is subject to a terminal disclaimer.

(21) Appl. No.: 12/035,737

(22) Filed: Feb. 22, 2008

(65) Prior Publication Data

US 2008/0147348 A1 Jun. 19, 2008

Related U.S. Application Data

(63) Continuation of application No. 10/132,142, filed on Apr. 25, 2002, now Pat. No. 7,337,162, which is a continuation of application No. 09/738,180, filed on Dec. 15, 2000, now Pat. No. 6,522,977.

(60) Provisional application No. 60/172,473, filed on Dec. 17, 1999.

(51) Int. Cl.
*G06F 17/30* (2006.01)
(52) U.S. Cl. ...................................... 707/708; 707/771
(58) Field of Classification Search ................. 707/1–6, 707/10, 100, 706–708, 754, 769, 770, 771
See application file for complete search history.

(56) References Cited

U.S. PATENT DOCUMENTS 4,813,000 A 3/1989 Wyman et al.

(Continued)

FOREIGN PATENT DOCUMENTS

EP 0 484 564 A 5/1992

(Continued)

OTHER PUBLICATIONS

U.S. Appl. No. 12/408,253, filed Mar. 20, 2009, Corrigan et al.

(Continued)

*Primary Examiner*—Cam-Linh Nguyen
(74) *Attorney, Agent, or Firm*—Diane R. Meyers; Robert P. Lenart

(57) ABSTRACT

A computer implemented method for matching paint on a vehicle, having the steps of receiving in a central computer, from a remote terminal, vehicle identifying information relating to a specific vehicle and a first set of paint color data from a portion of the body of the vehicle. The central computer includes a processor, an electronic storage means in which a database is stored. The database includes vehicle identifying information for a plurality of vehicles, paint color data associated with respective vehicle identifying information, and paint formulations associated with paint color data. A first process by software in the computer determines a first best match paint formulation which relates submitted vehicle identifying information and submitted paint data to a paint formulation. The software in the computer determines a first best match paint formulation which is transmitted to the remote terminal. The central computer receives a second set of paint color data from the remote terminal representing a surface of the specific vehicle painted with the first best paint formulation and compares by a second process the second paint color data to the first paint color data so as to establish accuracy data. The accuracy data is applied to the first process so as to be implemented in subsequent paint formulation identifications.

6 Claims, 1 Drawing Sheet

U.S. PATENT DOCUMENTS

Figure 1:
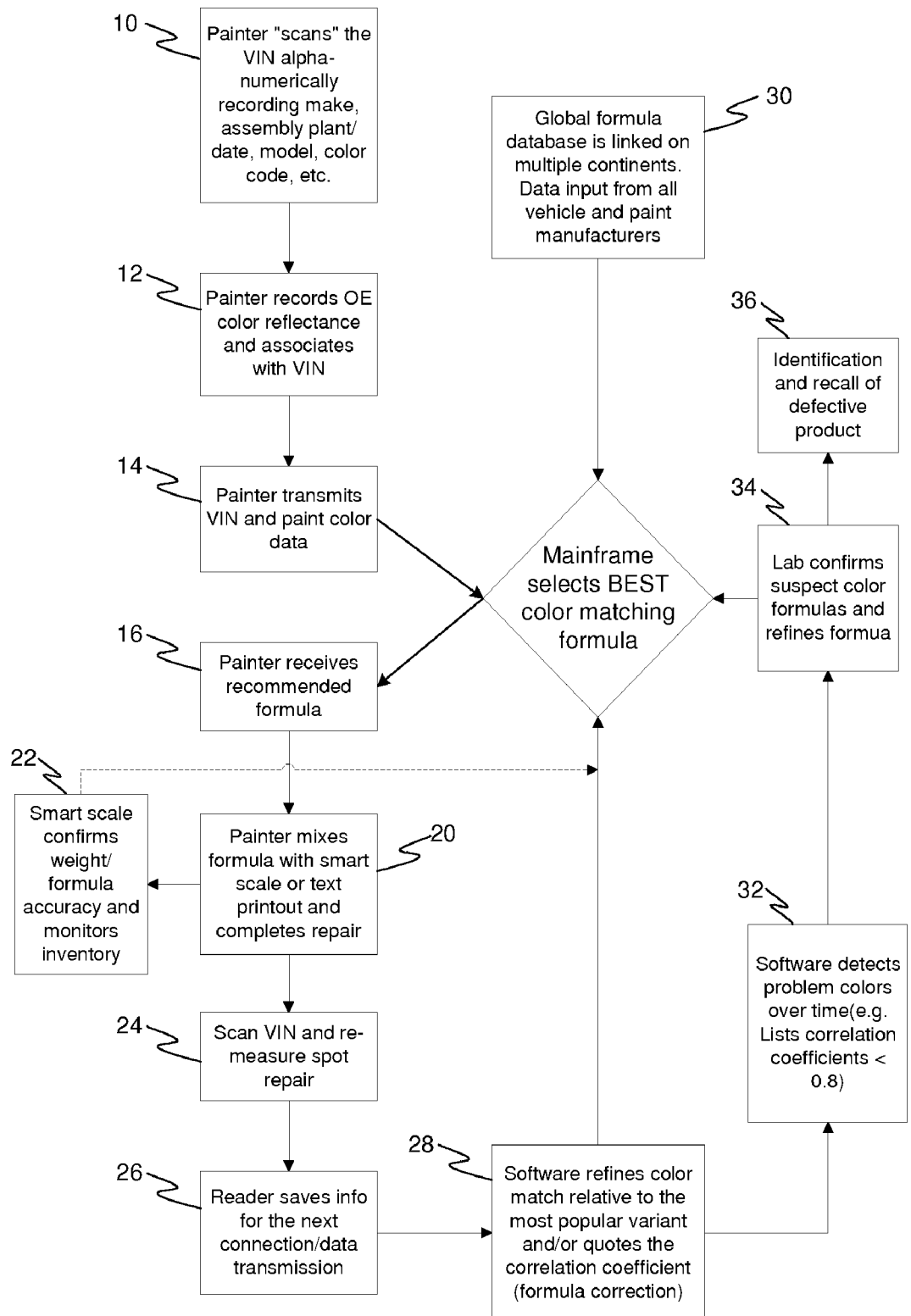

| | | | |
|---|---|---|---|
| 5,153,825 | A | 10/1992 | Yauk et al. |
| 5,197,764 | A | 3/1993 | Hicinbothem et al. |
| 5,414,626 | A | 5/1995 | Boorse et al. |
| 5,510,793 | A | 4/1996 | Gregg et al. |
| 5,668,633 | A | 9/1997 | Cheetam et al. |
| 5,841,421 | A | 11/1998 | Cheetam et al. |
| 5,987,396 | A | 11/1999 | Berner et al. |
| 6,053,218 | A | 4/2000 | Boers |
| 6,055,860 | A | 5/2000 | Pfanstiehl |
| 6,076,064 | A | 6/2000 | Rose, Jr. |
| 7,194,361 | B2 | 3/2007 | Corrigan et al. |
| 2002/0161530 | A1 | 10/2002 | Corrigan et al. |

FOREIGN PATENT DOCUMENTS

| | | |
|---|---|---|
| EP | 0 767 362 A | 4/1997 |
| JP | 61 204066 A | 9/1986 |
| JP | 63 031569 | 10/1988 |
| JP | 10 202184 | 4/1998 |

OTHER PUBLICATIONS

The Gale Group Trade & Industry DB, "Paint analysis in forensic lab aids in police investigations", May-Jun. 1994, v15, n5, p. 60(2).

"Catalog of Thunderbird ID Nos. 1955-93", 1994, Amos Press Inc., 217-218.

McDowell, "4.0 Project Plan", Info Systems: Refinish Information Systems, Aug. 12, 1996 (5 pages).

Nandor, Ron, "Prophet Color Analyzer System", Nov. 1, 1992 (6 pages).

PPG Access, TouchMix from PPG, Prophet Color Analyzer System attachment, Nov. 1, 1992 (2 pages).

Acua & Honda, "Find Your Color Code", Express Paint (9 pages).

PPG Industries, Inc., "1996 Corporate Color Information", 1996 (3 pages).

PPG Industries, Inc., "Color Information Bulletin", Jan. 1998 (1 page).

COMPUTER-IMPLEMENTED METHOD AND APPARATUS FOR MATCHING PAINT

RELATED APPLICATIONS

This application is a continuation of U.S. application Ser. No. 10/132,142, filed Apr. 25, 2002, which is a continuation of U.S. application Ser. No. 09/738,180 filed Dec. 15, 2000, now U.S. Pat. No. 6,522,977, which claims the benefit of U.S. Provisional Application Ser. No. 60/172,473, filed Dec. 17, 1999, entitled "Computer-Implemented Method and Apparatus for Matching Paint".

BACKGROUND OF THE INVENTION

The present invention is directed to a computerized method for matching paint on vehicles and a networked computer system for implementing the method.

Matching the original paint color on vehicles being repaired is an inexact process in which a person attempting to match the paint often must rely on trial and error processes by which the paint is matched. In spite of the availability of computerized color matching aids, the painter at a body shop often must ultimately resort to "eyeballing" the paint in order to achieve an acceptable match. This results in an inefficient process that can significantly affect labor cost in a typical body shop.

A number of methods have been devised to automate the process of paint matching. A typical automated method uses a device (e.g., a spectrophotometer) that measures certain qualities of the painted surface, such as reflectance at one or more wavelengths and at different angles, and automatically matches the measurements to those archived in a computer database in connection with paint formulas. In this method, the computer database is located at the repair facility. The paint formulas are then used to prepare a paint and the paint is compared to the original paint on the vehicle. If the paint matches, the area is painted. If not, the paint formula is adjusted manually by trial and error until a match is made. These processes are described in U.S. Pat. Nos. 5,668,633 and 5,841,421. The difficulty in these processes is that there is no assurance that the new formulation is entered into the local body shop's database, and no assurance that each computer database at each body shop will be updated. It is common in the automotive body repair industry to find most computer paint databases are not kept up-to-date. They are updated sporadically, and with limited feedback from the body shop to the manufacturer of the paint matching system.

Automobile paint color variability within the same nominal color is typically due to slight variations in color in the paint formulations used by the original equipment manufacturers (OEM). These variations may occur from one manufacturing location to another manufacturing location, or from one production run to another of a given color on the same vehicle model, or even during the course of a particular production run. Although these differences may be unnoticeable on separate vehicles, when they are present on adjacent body panels of the same vehicle, the differences can be visibly perceptible. These color variations make it difficult to attain excellent color matching in repair shops.

SUMMARY OF THE INVENTION

The present invention provides a system for matching paint color on a vehicle being repaired in which remote terminals located at a large number of repair shops transmit color readings and associated individual vehicle identification information to a central computer system. The central computer system includes a processor and a data storage device that contains a database of color data associated with particular vehicles and corresponding paint tinting information. After determining a recommended tinting formulation calculated to be a best known match to the measured color, the tinting formulation is transmitted to the remote terminal, and the repair shop formulates the paint and sprays the area to be repaired. Subsequently, the shop takes a color reading of the repaired area and transmits this second reading to the central computer system. The second reading is then processed to determine the accuracy of the recommended tinting formula, and correction data stored to be implemented in future tinting formula recommendations. In this manner the accuracy of the database is continually upgraded by means of large numbers of readings transmitted from the field.

The individual vehicle identification information may also be employed in the calculation of recommended tinting formulations, thereby improving the accuracy of the color match by taking into account variations in a manufacturing run of nominally the same color. By tracking trends in these variations in association with individual vehicle identification information, subsequent color matches can be made substantially more accurately for vehicles identified as having been part of the same manufacturing run.

The system of the present invention may optionally include an automated merit system for inducing repair shops to transmit color readings of completed jobs. This may entail a register for storing merit points for each repair shop and automatically adding merit points to the register for the shop each time it transmits a second color reading transmitted to the central computer for a particular vehicle. Accumulated merit points at certain levels may then be utilized as a basis to provide financial or other rewards to repair shops attaining target levels. Alternatively, the system could operate to register demerits for failure to transmit a second color reading with avoidance of predetermined demerit levels being a condition for continuing as an authorized member of the color matching system.

Thus it can be seen that an object of at least some aspects of the present invention involves providing a method and system for color matching vehicle paint colors that account for trends in colors over a production sequence. It is an object of other aspects of the present invention to provide a color matching method and system that updates automatically based on a large amount of feedback from a large number of sources, thereby yielding a highly accurate system.

The central computer system comprises a processor; one or more input ports for receiving scanned paint data and individual vehicle identifying information; an output port or device for communicating information to one of an output device, a remote terminal and/or a second computer; a storage means in which a database is stored in which paint formulations are stored in connection with vehicle identifying information for specific vehicles; software for implementing a process that compares vehicle identifying information received through said one or more input ports to vehicle identifying information stored in the database and determines a best match paint formulation based upon the comparison.

The system also includes a plurality of remote terminals for communicating to the central computer vehicle identification data and color data, such as reflectance data obtained from the surface of the vehicle being repaired. Each remote terminal may include a processor, one or more input ports for receiving color data and vehicle identifying data, an output port or device such as a modem for communicating information to the central computer system. Although inclusion of data storage means in association with the remote terminal is not precluded, it is an advantage of the present invention that the remote terminals need not be provided with substantial data storage or data processing capacity as is required for prior art systems that maintain a color matching database at each repair shop. Appropriate software may be included with the remote terminal for reading the data and transmitting it digitally to the central computer.

The system can also include software for implementing additional processes. For instance a process can be provided for collecting and analyzing physical measurements taken from a repaired surface of the vehicle and determining whether a given paint match was accurate. The system can include statistical processes for analyzing the accuracy of the paint match and for identifying paint measurements that indicate errors or malfunctions in obtaining the paint measurements at the remote location and/or errors in the formulation of the paint by the computer.

A computer-implemented method for matching paint is also provided that includes the steps of obtaining vehicle identifying information and paint measurements from a vehicle to be repaired and determining a best match paint formulation based at least partially on the vehicle identifying number of the vehicle to be repaired. The determination of a best match paint formulation can be made by comparison with, and in reference to, data stored in a central database that contains vehicle identifying information stored in connection with paint formulas and/or physical measurements taken from other repairs. Once the vehicle is repaired, paint measurements from the repair can be obtained and compared to the initial paint measurements. The information obtained from the scans can then be stored in the database to aid in prediction of paint formulations based upon the vehicle identifying information of the vehicle to be matched by increasing the number of data points in the central database.

The regular updating of the database provides each user at each remote location the benefit of the data obtained by matches determined for other users. A further advantage is that centralized management of color matching data is made possible, thereby eliminating the need to periodically update data on personal computers at a large number of repair shops. This also results in better control of the integrity and security of the data stored in the database.

It is another unique feature of this invention that it can be configured to provide for a color matching database that is continually being improved by feedback from a very large number of field locations. For example, for a given product line or brand of paint, virtually every use of the paint can be monitored for color accuracy and the color predicting algorithms improved in response thereto to yield continually improving accuracy. For a major product line of auto refinish paint with nation-wide or world-wide distribution, feedback can be expected from hundreds or thousands of repair shops, each typically handling several paint jobs daily. Data that is highly relevant statistically can be derived from such a system.

THE DRAWING

FIG. 1 is a flow diagram of the typical operation of an embodiment of the present invention.

DETAILED DESCRIPTION OF THE INVENTION

The individual vehicle identification information used in the present invention may be any unique identifying number (such as a serial number) or other indicia associated with a particular automobile, usually affixed to the vehicle by the manufacturer. For example, many automobiles include a "Vehicle Identification Number" (VIN) that is visible from the exterior of the automobile through the lower edge of the windshield. Because use of the VIN system is extensive on automobiles, it is currently the preferred identification information for use in the present invention. The VIN will be frequently referred to herein as the exemplary individual vehicle identification information, but it should be understood that any alternative identification system used regionally or which may supplant the VIN system in the future can be used in place of or in addition to the VIN system. It should also be apparent that the present invention may be practiced with any product being painted for which an accurate color match is desired. In addition to automobiles, other vehicles such as trucks, motorcycles, boats, airplanes and recreation vehicles sometimes require accurate color matching. But the objects being painted need not be limited to vehicles, nor are repairs the only occasion in which the invention may find utility.

The automobile VIN is typically (but not exclusively) a seventeen character alphanumeric identifier that provides the following information about the vehicle:

| | |
|---|---|
| Positions 1-3 | World Manufacturer Identifier |
| Position 4 | Restraint System Type |
| Positions 5-7 | Line, Series, Body type |
| Position 8 | Engine Type |
| Position 9 | Check Digit |
| Position 10 | Model Year |
| Position 11 | Assembly Plant |
| Positions 12-17 | Production Sequence Number |

This information is employed in the present invention to track and to permit modeling of trends in coloration in coating. Consequently, the identified trends and models can be used to predict color formulations for use in repair of a vehicle with increased accuracy. Although the present invention is described in connection with a VIN, any vehicle-specific designation that can be used to identify the location of the vehicle in a production sequence may be used to determine a best match color formulation according to the present invention.

One embodiment of a system for implementing the method of the preset invention includes a central computer and a number of remote terminals. The remote terminals include a scanning device for obtaining coloration data, such as without limitation reflectance data, from a painted surface of a vehicle and a VIN input device for obtaining a VIN number from a vehicle. The remote terminals also include a remote storage means for temporarily storing the obtained data and a communication device, such as a modem, for transmitting the obtained data to the central computer.

In this embodiment, the central computer includes one or more input and one or more output ports, which can be the same port(s), a processor and software for implementing the paint match according to the method of the present invention. In connection with the central computer is a central storage device by which a database is stored. The database includes data that is used to determine a requested color match. The data transmitted to the central computer can be stored, at least temporarily, on the central storage device or on a secondary central storage device.

Referring to FIG. 1, the present invention in its most basic form utilizes a network of remote terminals into which vehicle-specific information is supplied corresponding to the particular vehicle being repaired. FIG. 1 shows a flow diagram of the method of the present invention as used by one such terminal. This vehicle-specific information, particularly in the case of an automobile, may include the VIN number for that automobile, which may be manually input or scanned into the remote terminal in step 10. Additionally, paint color data is input into the remote terminal by scanning a sample of the paint to be matched with an appropriate color-measuring device (e.g., a spectrophotometer) in step 12. The remote terminals may store the information temporarily. In step 14, the information on the VIN and paint color is transmitted to the central computer. A best match paint formulation is determined by a paint matching process that may be performed in the remote terminal but preferably is performed in a central computer in step 16. When the paint matching process is performed at the central computer, the vehicle-specific information is also transmitted to the central computer. The central computer determines the best match and then forwards the best match paint formulation to the remote terminal.

The vehicle-specific information is matched by comparing information parsed from the VIN number with paint formulation information and physical data stored in connection with VIN information for other vehicles in a storage device, such as a hard drive. The storage device is connected to or integral with the remote terminal or the central computer. A paint formulation is recalled by this process and communicated to the user of the reading device. If no close VIN number is identified, the paint formulation can be interpolated or extrapolated based upon scanned physical data for known paint formulations that are stored in the database. In making a decision on the propriety of a match, the central computer weighs differentially the data provided in the VIN number and the scanned data to provide an accurate match. Greater weight is given to the VIN information when there is one or more close VIN numbers stored in the database.

Once the best match paint formulation is communicated to a remote user by an output device in step 20, such as a display or a printer, the user prepares the specified paint formulation and the vehicle is repaired. The amount of paint used by a paint shop in repairing a vehicle can be monitored in step 22 with a smart scale which confirms the weight of the components used to prepare the paint, the accuracy of the formula and monitors the inventory of paint components at the repair shop. When the paint has cured or dried, the repaired area of the vehicle is scanned by the color measuring device in step 24, color data regarding the newly painted area is transmitted to the central computer in step 26, and the accuracy of the match is determined by comparing the first set of color data (from the original paint) with the color data scanned from the repaired paint area in step 28. If the match is accurate (within a pre-determined range of accuracy), the vehicle identifying information and the corresponding paint formulation are recorded in the database for use in future matches. If the match is not accurate, the data is applied to a correction algorithm to improve future matches involving the same family of vehicles. More weight can be given to paint formulations stored in the database in connection with VINs having a close Production Sequence Number to the Production Sequence Number parsed from the VIN of the vehicle to be repaired.

The steps, components and operation of the present invention are described in further detail hereinafter.

Remote Terminal

The remote terminal used in steps 10 and 20 comprises a paint scanning device, for example, without limitation, a spectrophotometer or calorimeter, a vehicle identifying input device, one or more input and output ports (I/O ports) and a remote storage means. The remote terminals can be located at a large variety of vehicle repair shops that are geographically remote from each other, world-wide, with no theoretical limit to their number. This number can be substantial considering the large number of body shops, world-wide. All reading devices are in communication with a central computer. The means by which each reading device communicates with the central computer may vary and is limited only by the number of available means by which one computer can communicate with another. The communication can be, without limitation, direct through a local area network (LAN) or other direct hard-wired communication systems, over a wide area network (WAN), through a modem over standard telephone lines or by wireless communication through cellular telephone networks, or otherwise or through a variety of combinations of these or other known computer communication methods, including the global computer communications network referred to as the Internet. Encryption may be employed to preserve the confidentiality of proprietary information.

Paint Scanning Device

A typical paint scanning device used in step 10 is a handheld device that includes a device that measures the reflectance of a paint sample over the visible spectrum (about 300-700 nm). The measurement can be made at a number of angles (i.e., 3-5 different angles). Optionally, other physical data regarding the original finish of the vehicle can be measured by separate devices, such as gloss (i.e., at 60 degrees), depth of image and orange peel. These separate devices may be integrated into a single unit. The paint scanning device, the vehicle identifying input device, the I/O ports and the remote storage device may be provided as separate units in communication with, or capable of communication with each other, or they may be partially or completely integrated into one or more units, such as a handheld unit.

This data obtained by the paint scanner and the vehicle identifying input device is stored in memory (i.e., random access memory, RAM) or in a storage device, collectively termed a "remote storage means," in the remote terminal. The remote storage means can be integral with the reader or provided as a separate device in direct local communication with the reader, such as a personal computer or another stand-alone storage device. Paint scanners (i.e., colorimeters) and vehicle identifying input devices (i.e., alphanumeric keyboards or keypads) are available commercially and can be custom designed to fit into a single handheld device. Non-limiting examples of paint scanners are described in U.S. Pat. Nos. 4,771,580 and 4,853,879. Storage devices include any device that can store computer information either temporarily or permanently. Such devices include, without limitation, hard drives, diskettes, CD-ROMs, DVD ROMs, magnetic tapes, high capacity removable disks and other magnetic or optical storage devices onto which computer data may be temporarily or permanently recorded and read at a later time.

Vehicle Identifying Input Device

The vehicle identifying information is provided in step 20 by a vehicle identifying input device. The vehicle identifying input device can be either a scanner for scanning the vehicle identifying information as an image, an alphanumeric keypad or keyboard, other input device compatible with the particular vehicle identifying system. The keypad or the vehicle identifying scanner can be integral with or separate from the reader. If the vehicle identifying information is to be scanned as an image, a simple scanner can be provided, either integral with the reader, or as a separate device. Optical character recognition (OCR) software or firmware (collectively, an "OCR converter") can be provided at each remote location to convert the scanned image of the vehicle identifying information to computer recognizable text, such as ASCII text or rich text. The OCR converters can be any computer process that converts a scanned image of a number or a letter into a text character that is recognizable by a computer, such as ASCII Text.

Alternatively, the conversion of the vehicle identifying image to text can be performed by the central computer. Rather than providing the OCR converter at each remote location, the central computer houses the OCR converter. In this embodiment, the vehicle identifying image is forwarded intact to the central computer, which converts the vehicle identifying image to text. Although in this embodiment more data would be transferred from the remote storage to the central computer, this option may be more cost-effective than providing each reader with an OCR converter.

Central Computer

After the vehicle identifying information and physical color data are scanned into the remote terminal and the vehicle-specific information is transferred into the remote storage means, it is compared to data retrievable by the central computer and a first best match paint formulation is provided to the user at the remote location. The first best match paint formulation can be determined either locally at the remote terminal or (preferably) in a central computer. When the determination of a best match paint formulation is to be made at the central computer, the vehicle-specific information is communicated to the central computer, where the match is determined and the formulation is communicated to the remote terminal for use by the user.

Alternatively, the best match paint formulation is determined at the remote terminal and match information is transmitted to the central computer once the accuracy of the match is determined. In this embodiment, each remote terminal would be connected to the database of paint formulations stored in connection with vehicle identifying information and the database at the remote terminal is updated at fixed intervals. The update could be automatic and could be performed after working hours so as to not interfere with operation of the remote terminal during work hours.

The central computer comprises one or more input ports by which data is uploaded from the remote reading devices and/or from other sources, a processor, one or more data storage devices and one or more output ports by which data can be downloaded to the remote reading devices and/or to other locations. The central computer can be a personal computer, a mainframe-type computer, or any type of computer or computer network, so long as it can process data and communicate at a satisfactory rate. The processing and storage capacity of the central computer will therefore depend upon the number of remote reading devices and the level of their activity.

The input and output port(s) can be the same or different device(s) and communicate with the remote reading devices or other devices or locations by the variety of methods described above. The data storage device(s) of the central computer includes a database that comprises the paint matching data. The paint matching data comprises paint formulations, vehicle identifying data, physical paint data, which can include one or more of reflectance data, gloss data, depth of image data and orange peel data and data received from remote reading devices. Other data may be present, such as data or constants that would enable the processes used to generate paint matches and statistical data that can be used by the administrator of the paint matching system to evaluate the accuracy of the paint matching processes.

Databases

It must be recognized that database structures differ as well as the manner in which each given database searches and stores data. The data described herein need not be stored in separate tables or records, or in any particular form so long as the processes of the computer can achieve the described processes. The processes described herein are non-limiting examples with respect to a standard database structure. The manner of establishing the relationship between data is not as critical as the fact that the relationships are established. The following non-limiting description is described in reference to a typical relational database structure in which data is stored in tables and relationships are established between the data in the tables.

In one embodiment of the present invention, paint formulation tables include a list of ingredients that are combined to create a specifically colored paint. The ingredients comprise base paints and tinting compositions that impart a desired color to the paint. Other ingredients may be added, depending upon the nature of the paint. Such other ingredients include, without limitation, reflective pigments (i.e., metallic flakes) other special effect pigments (i.e., pearlescent) and gloss enhancers. Thus, the paint formulation table may include the formulation for a given matching color.

The vehicle identifying data table(s) comprise at least one table which includes unique, vehicle-specific identification data (e.g., VIN numbers). Because certain characters in a VIN number have greater relation than others to the color of the vehicle and to color trending; such as, without limitation, the Assembly Plant and the Production Sequence Number, these data may be parsed automatically and stored in separate tables of fields. However, these data need not be broken out into separate fields to achieve the purpose of the present invention because a process can be applied that can parse the total VIN number for pertinent data.

The paint formulation tables are related to physical data tables based upon actual physical readings from surfaces coated (finished) with the paint product of the paint formulation. The vehicle identifying table(s) are related to the physical data tables and the paint formulation tables. These relationships are based upon readings taken from actual vehicles.

In this embodiment, the central computer is configured with software to implement a process that enables the computer to match paint. When information is received from a remote terminal, it is stored in the central computer in one or more tables. All information received regarding one vehicle is stored in relationship to the vehicle identifying information.

Paint Data Matching Process

Once data is received from the remote reading device, the vehicle identifying information that describes some or all of the vehicle's make, model, year, line, series, body type and assembly plant is matched with vehicle identifying information stored on the central computer to retrieve a first set of matches. The physical data received from the remote reading device, especially the reflectance data, is used to narrow the first set of matches to a second set of matches which optimally contains only those vehicles with the same general paint color (the manufacturer's designated colors, such as those designated by OEM code numbers, hereinafter "OEM colors"). Alternately, the data indicating which vehicles in a production sequence are colored each manufacturer's designated color may be obtained from a manufacturer, since manufacturers typically paint vehicles in batches. Manufacturers' data preferably is transmitted to the central computer in step 30 from vehicle manufacturers and paint manufacturers worldwide.

At this point, the computer process determines a paint match from the second set of data that is limited by vehicle identifying information and OEM color. An example of such a matching operation is as follows. First, if a VIN Production Sequence Number in the second set of matching paint formulations is sufficiently "close" to the Production Sequence Number downloaded from the remote reader, the paint formulation corresponding to the stored close Production Sequence Number is recommended, provided that the physical data stored in connection with the paint formulation matches the physical data obtained from the remote location. If a "close" Production Sequence Number is not available, the formulation is interpolated or extrapolated from paint formulations for other Production Sequence Number in the same production sequence. Lastly, if the paint formulation cannot be interpolated or extrapolated with a predetermined degree of statistical confidence, the paint physical data is used to match the paint by matching or by extrapolation or interpolation.

In the first step, if the production sequence number of the received VIN is close to that of a VIN stored on the central computer, the paint formulation which is related to the stored VIN number is considered to be a best match. A "close" production sequence number may be within a designated production sequence number unit or can be expressed as a percentage of the total vehicles in a given production sequence. The total number of automobiles in any given production sequence is broadly available from manufacturers and/or from VIN searching agencies. It should be recognized that the degree of color trending for a given production series at a given manufacturing facility can vary little or greatly. A close production sequence number for one production series may not be considered close for another.

Literally, a close match is a match that would be considered acceptable to a vehicle owner, and relates to the inability to discern by eye the differences between the vehicle's original paint and the matching paint. Thus, the measurable physical parameters between matching paints for two vehicles with "close" VINs should not differ significantly. Consequently, one sub-process that can be integrated with the matching process would vary the value for "closeness" for any production sequence to account for the degree of trending of color in a production series. For instance, the default setting for a production series may consider a close VIN as one having a Production Sequence Number within a certain number of vehicles. If, over time, there is no color trending seen in the entire production sequence, as determined by either the received color data or the formulation data, the limit for "close" vehicles could be expanded to a larger number of units. If, on the other hand, color trending is seen which is discernable in vehicles with Production Sequence Numbers differing by fewer units than the default, the limit for "close" vehicles can be narrowed.

The software for determining a "match" can be any software program that is capable of matching two data sets and determining whether certain records in one data falls within predetermined ranges, for example and without limitation, lookup functions. The ranges can be set manually by an operator or can be determined statistically. Each parameter can be weighted differently and/or matched in different sequences. For instance, when matching VIN information, the World Manufacturer Identifier might be matched exactly, as might the Line, Series, Body type, Model Year and Assembly Plant data. The Production Sequence Numbers could be matched within a predetermined range, within a percentage of the total number of vehicles manufactured in the same production series of vehicles or manufactured within the same fixed time period. In either case, a sub-process may be made available to calculate the "closeness" of the match of the Production Sequence Numbers. If the matching criterion for the Production Sequence Numbers is based upon a fixed time period, a sub-process must be available which identifies which Production Sequence Numbers were manufactured within the given fixed time period. The production information necessary to run such a sub-process can be obtained from a manufacturer.

The second step of the matching process could optionally be reserved for instances in which the database contains insufficiently "close" individual vehicle information for that particular model, or it may be performed in each color matching cycle, or performed only for selected vehicle groups. This process involves interpolation or extrapolation of paint formulations from known matching formulations. Typically, in such a case most of the VIN information would match exactly, but the Production Sequence Number would not fall within an acceptable "close" range. In such a case, the paint formulations corresponding to other Production Sequence Numbers in the same production sequence can be used to generate a new formulation by interpolation and/or extrapolation of values for each ingredient in the formulation based on the amount of ingredients in the other formulations in the same production sequence. Optionally, chromaticity values for each tinting composition can be drawn upon to determine the best match color formulation. The interpolated or extrapolated formulation can be obtained by implementing interpolation or extrapolation functions that are commercially available in common spreadsheet or database programs. The interpolations are typically obtained by generating a series of curves (i.e., best fit lines) which relate Production Sequence Number to the amount of each Toner (pigment) or other ingredient, such as metallic flakes, used in a given formulation and determining the amount of each ingredient for the Production Sequence Number of the vehicle to be matched. Chromaticity values for tinting compositions can be considered in this process. More than one flanking formulation can be considered in generating the best fit curve for each ingredient of the formulations.

Paint formulations can also be extrapolated. Extrapolation is necessary in two instances. First, if the Production Sequence Number of the vehicle to be matched is greater than or less than that of all formulations represented in the database for a production series, the formulation values must be extrapolated. Second, in the case where the Production Sequence Number of the vehicle to be matched falls between two related Production Sequence Numbers in the database, one or more different ingredients may have been used in the formulations. By generating best fit curves both for those Production Sequence Numbers lower than and/or higher than the Production Sequence Number of the vehicle to be matched, the amount of each ingredient can be extrapolated with reasonable accuracy.

For the purposes of the present invention, a best fit curve for each ingredient can be a line or a more complex relationship. The limits to the complexity of the curve can be preset by the operator to optimize the speed of the system and the accuracy of the prediction.

In certain cases, a production sequence might not be represented by a paint formulation, or a formulation might not be determinable to a predetermined degree of statistical significance by interpolation or extrapolation. In such a case, the process would use the physical data obtained from the vehicle to be matched and would provide a formulation to best match the physical data according to known approaches. The matching sub-process might be similar to that process for matching formulations based upon the Production Sequence Number, but would consider the physical data as well as the VIN information in determining a match. The logic of this process would be the same as the process for matching the formulations based upon physical data, but would use reflectance data, and/or other physical parameters to determine flanking formulations. Other processes and apparatuses are available to calculate matches based upon physical data alone, such as that described in U.S. Pat. No. 4,997,522.

Matching by physical parameters might only be relied upon in determining a match when there is insufficient data to determine the match based upon the VIN information. When the match determination is made based upon the VIN information, the physical parameters can be used only to limit the formulations under consideration to the manufacturer's designated color. However, in one embodiment, the paint formulations provided by the paint matching process may be compared to paint formulations based upon measured physical parameters and weighted variably in calculating a match. The greater the number of VIN data points and the closer the proximity of the Production Sequence Numbers of the VIN data points to the Production Sequence Number of the vehicle under repair, the greater the weight given to the paint formulation calculated by the VIN information. However, when there are less VIN data points, the physical data may be relied upon more heavily to determine the paint formulation. Statistical sub-processes may be employed to determine the potential accuracy of the paint formulation based upon the VIN information and, depending upon predetermined criteria, the respective weighting of the VIN information and physical parameters, paint formulations can be determined automatically.

Once a matching formulation is determined by the central computer, it is communicated back to the remote terminal. The formulation can be displayed on a visual display connected to, or integral with, the reading device or it can be printed by a printing device connected to, or integral with, the reading device. By the phrase "connected to" it is understood that the "connected" devices are in communication with each other by one of many means known in the art, whether "wired" or "wireless". For instance and without limitation, if the display and/or the printing device are provided separately from the reading device, they can be connected to the reading device by parallel or serial communication, EtherNet, FireWire, USB, SCSI, infrared or other communication means or interfaces.

At this point, the remote user can prepare a paint sample according to the provided formulation and the paint sample can be applied to the vehicle. Once the matching paint is applied to the vehicle, irrespective of whether or not a visual match is made, the user again reads the VIN and the physical parameters of the repaired surface. The remote terminal might be configured to require input of a VIN every time a scan is made of the paint. This data is then communicated to the central computer where it is compared to the original physical parameters measured from the same vehicle in step 12. If the physical data sets match with a preset degree of correlation, then the formulation, VIN information and physical data can be entered into the database for use in future matches. If the correlation between the physical data is imperfect, or if upon visual inspection of the repair the remote user indicates that a match is not perfect, then the match formulation, VIN information excluding the Production Sequence Number and physical data for that formulation are stored in the database. This results in a data set that is useful when matching, interpolating or extrapolating a paint formulation based upon physical parameters, but not in matching based upon Production Sequence Number. The software in the central computer may be refined to provide a match based on the most popular variant of OE color (a shift from an original color).

In cases where the match cannot be made with any statistical confidence, the paint can be applied to an appropriate test surface or only a small portion of the test vehicle prior to painting the entire surface of the vehicle that must be painted. The application of the paint to a test surface may be recommended automatically by the central computer in situations where the paint formulation is determined by interpolation and/or extrapolation, and especially where a predetermined level of statistical confidence in the match cannot be met.

The remeasurement of the physical parameters of the painted surface after application of the recommended paint formulation is not an automatic process. The remote user must physically measure the painted surface with the reading device. As such, the central computer can record instances of when a remote user measures the repaired surface and tallies these instances. The provider of the paint matching services can then track these instances and can reward the remote user with rebates and/or product credits for taking the time to measure the painted surface, rather than simply accepting that the paints match visually.

An additional process can be integrated with the paint matching and verification processes that identifies data points and data contributed by each individual remote user. Every time a remote user communicates with the central computer, a user identification code can be communicated to the central computer and every data point or record contributed by that user can be tagged with that user's identification code. By this process, the central computer can identify data points that correlate with other data points or data curves to a certain degree of confidence. If a particular user's (either a particular person or repair facility) data points vary too greatly and/or too regularly, the provider of the paint matching services can be notified and field representatives can be sent to the remote user's facility to determine whether the statistical deviation is due to user error or to equipment malfunction. The equipment can then be repaired or the user trained. The tracking by user can be used as a method for implementing a certification program for technicians and/or facilities.

An additional process in optional step 32 can be integrated with the paint matching processes to identify manufacturer's designated colors that are difficult to match over time. This additional process would identify such colors by measuring the correlation between the original paint physical data and the physical data for the matching paint. If the correlation between the original and the matching paint falls below a predetermined threshold, a predetermined percentage of time (e.g., correlation coefficient of less than 0.8), the provider of the paint matching service can be notified and appropriate research can be conducted in step 34 to determine how to measure that paint accurately or whether to reformulate a color formula and/or recall that color formula in step 36.

The accumulation of data points in any given production sequence benefits future users of the system because the greater the number of data points, the greater the confidence of the matches based primarily upon VIN information. Therefore, when the system is first set up, based upon known data points either gathered in the field or determined in the laboratory, more extrapolation and/or interpolation will be conducted than later when the database "matures". When many data points are available for a given production sequence, certain statistically disparate data points can be ignored and, thus, the accuracy of matching will increase with the system's maturity. As such, for many product lines a "perfect" match can be ensured.

It may be noted that paint application techniques can affect the appearance of the color of a repainted surface. Therefore, "matching" as used herein, is not intended to mean that an absolutely perfect match can be guaranteed, since there are variable factors beyond the control of the color matching system.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

I claim:

1. A method for determining a refinish colorcoat composition that matches the color and color effect of a vehicle's original finish, comprising:

gathering the VIN (vehicle identification number) and paint color data from a vehicle needing refinishing;

extracting from the VIN, the model year and manufacturing site information for that vehicle;

using a computer to search a database that contains paint color data, refinish data assigned to the paint color data that indicates the matching refinish colorcoat compositions for the paint color data, and VIN numbers assigned to the refinish colorcoat compositions that indicate the model years and manufacturing sites for the refinish colorcoat compositions; and identifying the refinish colorcoat composition in the database that matches the paint color data, model year, and manufacturing site extracted from the vehicle, thereby revealing the refinish colorcoat composition that matches the color and color effect of the vehicle's original finish.

2. The method of claim 1 as practiced by a computer acting under a program.

3. A computer system for retrieving a refinish colorcoat composition that matches the color and color effect of the vehicle's original finish, which comprises a computer that performs the method of claim 1.

4. A method for determining a refinish colorcoat composition that matches the color and color effect of a vehicle's original finish, comprising:

ascertaining paint color data, model year, and site of manufacture of a vehicle needing refinishing;

using a computer to search a database of refinish colorcoat compositions wherein each refinish composition in the database has assigned thereto paint color data, a vehicle model year, and a vehicle site of manufacture; and identifying the refinish colorcoat composition in the database that matches the paint color data, model year, and manufacturing site extracted from the vehicle, thereby revealing the refinish colorcoat composition that matches the color and color effect of the vehicle's original finish.

5. The method of claim 4 as practiced by a computer acting under a program.

6. The method of claim 4 wherein the model year and site of manufacture are ascertained from the VIN (vehicle identification number).

* * * * *